(12) United States Patent
Takahashi et al.

(10) Patent No.: US 9,140,361 B2
(45) Date of Patent: Sep. 22, 2015

(54) MULTI-PIECE OIL RING

(75) Inventors: Junichi Takahashi, Saitama (JP); Takashi Ono, Saitama (JP); Gyo Muramatsu, Niigata (JP); Takayuki Ichikawa, Niigata (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/008,632

(22) PCT Filed: Mar. 29, 2012

(86) PCT No.: PCT/JP2012/058488
§ 371 (c)(1),
(2), (4) Date: Sep. 30, 2013

(87) PCT Pub. No.: WO2012/133714
PCT Pub. Date: Oct. 4, 2012

(65) Prior Publication Data
US 2014/0021686 A1    Jan. 23, 2014

(30) Foreign Application Priority Data
Mar. 31, 2011  (JP) .................................. 2011-080778

(51) Int. Cl.
*F16J 9/12* (2006.01)
*F16J 9/06* (2006.01)
(Continued)

(52) U.S. Cl.
CPC .. *F16J 9/12* (2013.01); *F16J 9/064* (2013.01); *F16J 9/066* (2013.01); *F16J 9/203* (2013.01); *F16J 9/26* (2013.01)

(58) Field of Classification Search
USPC ................................................ 277/440–444
See application file for complete search history.

(56) References Cited

U.S. PATENT DOCUMENTS 3,281,156 A * 10/1966 Anderson et al. .............. 277/463
3,771,801 A * 11/1973 Burke ............................ 277/584
(Continued)

FOREIGN PATENT DOCUMENTS

JP    10-157013 A    6/1998
JP    2000-27995 A    1/2000
(Continued)

OTHER PUBLICATIONS

International Search Report for PCT/JP2012/058488 dated May 22, 2012.

*Primary Examiner* — Vishal Patel
*Assistant Examiner* — L. Susmitha Koneru
(74) *Attorney, Agent, or Firm* — Kenealy Vaidya LLP (57) ABSTRACT

A multi-piece oil ring is provided in which, even after long-term operation of an engine, adhesion and deposition of oil sludge are prevented, sticking of components does not occur, and a high oil control function can be maintained. The multi-piece oil ring includes a spacer expander and a pair of upper and lower side rails supported by the spacer expander. To achieve the above features, at least side faces of the side rails that face the spacer expander are coated with a fluorine-containing coating, and the spacer expander is coated with a metal coating. The angle of contact ($\theta_1$) of a paraffin-based lubricating oil with the portions of the side rails at 150° C. that are coated with the fluorine-containing coating is 50° or larger, and the angle of contact ($\theta_2$) of the paraffin-based lubricating oil with the portion of the spacer expander at 150° C. that is coated with the metal coating is 10 to 50°. The difference between $\theta_1$ and $\theta_2$ ($\theta_1 - \theta_2$) is 30° or larger.

20 Claims, 1 Drawing Sheet

(51) Int. Cl.
  *F16J 9/26*   (2006.01)
  *F16J 9/20*   (2006.01)

(56) References Cited

U.S. PATENT DOCUMENTS

| | | | | |
|---|---|---|---|---|
| 5,469,616 | A * | 11/1995 | Miyazaki et al. | 29/888.074 |
| 5,564,699 | A * | 10/1996 | Lawrence et al. | 277/497 |
| 2006/0113730 | A1 * | 6/2006 | Suzuki et al. | 277/434 |
| 2008/0053396 | A1 * | 3/2008 | Hiraishi et al. | 123/193.2 |
| 2009/0058014 | A1 * | 3/2009 | Kariya et al. | 277/442 |
| 2012/0235359 | A1 * | 9/2012 | Gao et al. | 277/442 |

FOREIGN PATENT DOCUMENTS

| | | | | |
|---|---|---|---|---|
| JP | 2000027995 A | * | 1/2000 | F16J 9/26 |
| JP | 2006-258110 A | | 9/2006 | |
| JP | 2006-291884 A | | 10/2006 | |
| JP | 2006-300224 A | | 11/2006 | |
| JP | 2010-174996 A | | 8/2010 | |

* cited by examiner

MULTI-PIECE OIL RING

This application is a U.S. national phase filing under 35 U.S.C. §371 of PCT Application No. PCT/JP2012/058488, filed Mar. 29, 2012, and claims priority under 35 U.S.C. §119 to Japanese patent application no. 2011-080778, filed Mar. 31, 2011, the entireties of both of which are incorporated by reference herein.

TECHNICAL FIELD

The present invention relates to a multi-piece oil ring to be attached to a piston of an internal combustion engine and more particularly to a multi-piece oil ring for an internal combustion engine that can effectively prevent adhesion and deposition of oil sludge generated by deterioration of lubricating oil for the engine and also sticking of components caused by the adhesion and deposition of oil sludge.

BACKGROUND ART

In an internal combustion engine, lubricating oil is heated and exposed to blowby gas during long-term operation of the engine, and unburned products of hydrocarbons and denatured products of oil additives are contained in the lubricating oil at the same time. These unburned products and denatured products of oil additives are generally collectively referred to as "oil sludge." If such oil sludge adheres to engine components and is then deposited thereon, these components may be worn, and passages for the lubricating oil may be clogged, so that the functions of the engine components such as oil rings may be hindered.

Figure 1:
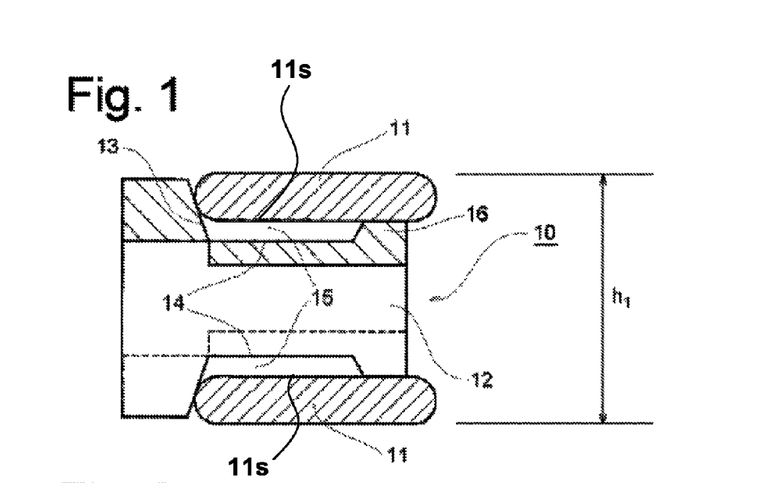
FIG. 1 is a cross-sectional view illustrating an example of an expander/segment oil control ring (three-piece oil ring).

FIG. 1 shows a cross-sectional view of an expander/segment oil control ring (three-piece oil ring) 10. This three-piece oil ring 10 includes a pair of annular side rails 11 each having an abutment joint and a spacer expander 12 that supports the side rails 11. Tabs 13 are formed on the inner peripheral side of the spacer expander 12, and protruding portions 16 for supporting the side rails 11 are formed on the outer peripheral side. Flat base dents 14 are provided in sections connecting the tabs 13 and the protruding portions 16. When the spacer expander 12 is combined with the side rails 11, spaces 15 surrounded by the tabs 13, the protruding portions 16, the base dents 14, and the side rails 11 are formed.

In the three-piece oil ring 10, the side rails 11 are pressed by radial and axial component forces caused by the angles of the tabs 13 of the spacer expander 12, thereby exerting a sealing function on the wall surface of a cylinder and on the upper and lower surfaces of a ring groove. In particular, a narrow-width three-piece oil ring having a reduced axial width, i.e., a reduced dimension h1, has good conformability to the cylinder wall surface and also has a side sealing function. Therefore, even when the tension of the oil ring is small, friction loss can be reduced without an increase in oil consumption. However, in such a three-piece oil ring 10, oil sludge is more likely to be deposited in the spaces 15 between the side rails 11 and the base dents 14 on the outer peripheral side of the tabs 13 of the spacer expander 12. In particular, when the three-piece oil ring has a reduced axial width, the deposition of oil sludge may cause sticking of the side rails 11 to the spacer expander 12. When sticking occurs, the conformability of the side rails 11 to the inner peripheral face of the cylinder is lowered, and the oil consumption is likely to increase.

To prevent adhesion and deposition of oil sludge onto an oil ring etc., it has been contemplated to use liquid repellent treatment with, for example, a fluorine-containing coating. More specifically, an oil repellent coating is formed on the surface of the oil ring to prevent adhesion of oil sludge in the lubricating oil. Examples of the material of the fluorine-containing coating used for the oil repellent treatment include polytetrafluoroethylene and fluoro alkylsilane. For example, Patent Literature 1 proposes a method of forming a liquid repellent film by a sol-gel method using a metal alkoxide and a fluoroalkyl group-substituted metal alkoxide prepared by substituting a fluoroalkyl group for part of the alkoxy group (alkoxyl group) in the metal alkoxide. It is known that a material containing a fluoroalkyl group has water repellency and oil repellency. Therefore, by providing a coating film having fluoroalkyl groups on its surface, liquid repellency is imparted to engine components to prevent adhesion and deposition of oil sludge. Patent Literature 2 discloses a technique for improving the effect of preventing adhesion and deposition of oil sludge by using a fluorine-containing coating having an increased thickness. To increase the thickness of the coating, the polymerization of the fluoroalkyl group-substituted alkoxide is promoted before a coating solution is applied to a substrate.

Patent Literature 3 describes that, when components for an internal combustion engine are coated with a carbon-based film having a prescribed surface free energy and a prescribed coating roughness, repellency to deposits (oil sludge) is improved. Therefore, deposition of the deposits and sticking are suppressed, and efficient combustion operation is maintained with small performance degradation. Polypropylene resins, perfluoroethylene propylene (FEP) resins, polytetrafluoroethylene (PTFE), fluoro alkylsilanes, etc. are exemplified as the carbon-based film.

In a multi-piece oil ring described in Patent Literature 4, a nitride layer is formed on the shear surfaces of the tabs of a spacer expander, and a Ni plating is formed on the surfaces of the spacer expander other than the shear surfaces. In addition, a thin film formed only of a fluorine-based organic material is formed on the outermost surfaces of the spacer expander that face the side rails and/or the surfaces of the side rails that face the spacer expander. It is shown that the formation of the Ni plating prevents nitriding of the surfaces other than the shear surfaces of the tabs, so that unevenness in tension of the spacer expander that is caused by unevenness in thickness of the nitride layer is reduced. In addition, there is a description that the thin film coating formed only of the fluorine-based organic material provides the effect of preventing adhesion of oil sludge. Specific examples of the raw material of the fluorine-based organic thin film include fluoroalkyl group-substituted metal alkoxides in which part of the alkoxy groups are substituted with fluoroalkyl groups and metal halides having fluoroalkyl groups.

As described above, to prevent adhesion and deposition of oil sludge, it has been contemplated to coat the surface of an oil ring with a fluorine-containing coating. However, with the conventional coating structures, the effect of preventing adhesion and deposition of oil sludge is not sufficient. Therefore, there is a demand for a multi-piece oil ring for an internal combustion engine that can prevent sticking even after long-term operation and can maintain a high oil-control function.

[Patent Literature 1] Japanese Patent Application Laid-Open No. 2000-27995

[Patent Literature 2] Japanese Patent Application Laid-Open No. Hei. 10-157013

[Patent Literature 3] Japanese Patent Application Laid-Open No. 2006-291884

[Patent Literature 4] Japanese Patent Application Laid-Open No. 2006-300224

DISCLOSURE OF THE INVENTION

Problems to be Solved by the Invention

Accordingly, it is an object of the present invention to provide a multi-piece oil ring for an internal combustion engine that can prevent adhesion and deposition of oil sludge even after long-term operation of an engine and can thereby maintain a high oil control function without sticking of components.

Means for Solving the Problems

In view of the foregoing object, the present inventors have conducted extensive studies and found that adhesion and deposition of oil sludge can be effectively prevented in the following manner. By setting the oil repellency of the side faces of the side rails that face the spacer expander to be higher than the oil repellency of the surface of the spacer expander to thereby provide a prescribed difference therebetween, a flow of oil is generated from the side rails having high oil repellency toward the spacer expander having low oil repellency. By combining such a spacer expander and side rails, adhesion and deposition of oil sludge are effectively prevented, and therefore the inventors have arrived at the present invention.

Accordingly, the multi-piece oil ring of the invention comprises a spacer expander and a pair of upper and lower side rails supported by the spacer expander. In the multi-piece oil ring, the angle of contact ($\theta_1$) of a paraffin-based lubricating oil with the side faces of the side rails that face the spacer expander at 150° C. is larger than the angle of contact ($\theta_2$) of the paraffin-based lubricating oil with the surface of the spacer expander at 150° C., and the difference therebetween ($\theta_1 - \theta_2$) is 30° or larger.

Effects of the Invention

In the multi-piece oil ring of the invention, the oil repellency of the side faces of the side rails that face the spacer expander is higher than the oil repellency of the surface of the spacer expander, so that a prescribed difference is provided therebetween. Since the flow of the oil from the side rails toward the spacer expander is accelerated by convection caused by the difference in oil repellency and the difference in temperature, the generated oil sludge can be rapidly discharged. Therefore, adhesion and deposition of oil sludge can be effectively suppressed, and the occurrence of sticking of the multi-piece oil ring can be prevented.

In the present invention, by coating the spacer expander having a large surface area with a metal coating having high heat dissipation, the heat dissipation effect from the multi-piece oil ring to the oil can be improved. Accordingly, an increase in temperature of the multi-piece oil ring is suppressed. Therefore, even when the side rails are coated with a fluorine-containing coating, thermal decomposition and degradation of the coating are suppressed, and a high effect of preventing adhesion and deposition of oil sludge is maintained even after long-term operation.

MODE FOR CARRYING OUT THE INVENTION

The multi-piece oil ring of the present invention will next be described in detail.

FIG. 1 shows a cross-sectional view of a three-piece oil ring (expander/segment oil control ring) which is an example of the present invention. This oil ring 10 includes a pair of annular side rails 11 each having an abutment joint and a spacer expander 12 that supports the side rails 11. Tabs 13 are formed on the inner peripheral side of the spacer expander 12, and protruding portions 16 for supporting the side rails 11 are formed on the outer peripheral side. Flat base dents 14 are provided in sections connecting the tabs 13 and the protruding portions 16. When the spacer expander 12 is combined with the side rails 11, spaces 15 surrounded by the tabs 13, the protruding portions 16, the base dents 14, and the side rails 11 are formed.

The present invention is characterized in that the oil repellency of the side faces 11s of the side rails 11 that face the spacer expander 12 is made higher than the oil repellency of the surface of the spacer expander 12 to thereby provide a prescribed difference in oil repellency therebetween. More specifically, let the angle of contact of a paraffin-based lubricating oil with the side faces of the side rails that face the spacer expander at 150° C. be $\theta_1$, and the angle of contact of the paraffin-based lubricating oil with the surface of the spacer expander at 150° C. be $\theta_2$. Then the difference in the angle of contact ($\theta_1 - \theta_2$) is 30° or larger. Convection caused by the difference in oil repellency causes the flow of oil from the side rails to the spacer expander, so that the oil including oil sludge built up between the spacer expander and the side rails can be rapidly discharged. Therefore, adhesion and deposition of oil sludge can be effectively suppressed, so that the occurrence of sticking of the oil ring can be prevented. The difference ($\theta_1 - \theta_2$) between the angle of contact ($\theta_1$) of the paraffin-based lubricating oil with the side faces of the side rails that face the spacer expander at 150° C. and the angle of contact ($\theta_2$) of the paraffin-based lubricating oil with the surface of the spacer expander at 150° C. is preferably 35° or larger and more preferably 40° or larger.

The angle of contact ($\theta_1$) of the paraffin-based lubricating oil with the side faces of the side rails that face the spacer expander at 150° C. is preferably 50° or larger and more preferably 70° or larger. The angle of contact ($\theta_2$) of the paraffin-based lubricating oil with the surface of the spacer expander at 150° C. is preferably 10 to 50° and more preferably 10 to 30°. Within the above ranges, the flow of oil from the side rails toward the spacer expander is likely to be generated, so that the oil including oil sludge built up between the spacer expander and the side rails can be smoothly discharged.

No particular limitation is imposed on the coating structures of the side rails and the spacer expander. When the side rails and the spacer expander are combined such that the value of ($\theta_1 - \theta_2$) falls within the above range, one or both of the spacer expander and the side rails may be used in their base form without being covered with a coating.

Preferably, the side rails used have a configuration in which their side faces facing the spacer expander are coated with, for example, a fluorine-containing coating having high oil repellency. Preferably, the spacer expander is configured to be coated with a metal coating having high heat dissipation properties and having lower oil repellency than that of the fluorine-containing coating. By coating the spacer expander having a large surface area with such a coating having high heat dissipation properties, the effect of dissipating heat from the multi-piece oil ring to the oil is improved. Therefore, an increase in the temperature of the multi-piece oil ring is suppressed, so that, even when the side rails are coated with the fluorine-containing coating, the thermal decomposition or deterioration of the coating is suppressed and the effect of preventing adhesion and deposition of oil sludge is maintained even after long-term operation. Accordingly, the multi-piece oil ring of the invention can maintain its high oil control function for a long time.

(Measurement of Angle of Contact)

The oil repellency is evaluated using the angle of contact of a paraffin-based lubricating oil at 150° C. determined by the following measurement method.

A measurement sample is secured to an aluminum-made hot stage provided with a heater, and the temperature of the surface of the sample is measured with a thermocouple and controlled to 150±2° C. 0.2 μL of the paraffin-based lubricating oil (paraffin-based raw lubricating oil "Super Oil N100," manufactured by Nippon Oil Corporation) is dropped onto the measurement sample using a micropipette. The angle of contact is measured using an automatic contact angle meter (Drop Master 500, manufactured by Kyowa Interface Science Co., Ltd.). The measurement is performed at 10 points for one sample, and their average value is used as the angle of contact for the sample. For the side rails, the lubricating oil is dropped onto their side faces facing the spacer expander. For the spacer expander, the lubricating oil is dropped onto its base dents 14 that are sections connecting the tabs 13 to the protruding portions 16.

When the area of the flat portions is too small to perform the above measurement, an automatic microscopic contact angle meter (MCA-3, manufactured by Kyowa Interface Science Co., Ltd.) or a nano-dosing or pico-dosing system of a micro automatic contact angle meter (OCA40 micro manufactured by EKO INSTRUMENTS), for example, may be used. In this case, a sample for which the angle of contact has been checked in advance by the above measurement method is used to find the correlation between the measurement method (the amount of drip) and the angle of contact, and the results are converted to values obtained by the above measurement method (0.2 μL).

The side rails and spacer expander in the multi-piece oil ring of the invention will next be described independently.

1) Side Rails

The angle of contact ($\theta_1$) of the paraffin-based lubricating oil with at least one of the side faces of each side rail, i.e., the side face facing the spacer expander, at 150° C. is set to be higher by at least 30° than the angle of contact ($\theta_2$) of the paraffin-based lubricating oil with the surface of the spacer expander at 150° C. The convection caused by the difference in oil repellency and the difference in temperature causes the flow of the oil from the side rails toward the spacer expander, so that the oil including oil sludge built up between the spacer expander and the side rails can be rapidly discharged. Therefore, adhesion and deposition of oil sludge are effectively suppressed, and the occurrence of sticking of the multi-piece oil ring can be prevented.

More specifically, the angle of contact ($\theta_1$) of the paraffin-based lubricating oil with the side faces of the side rails that face the spacer expander at 150° C. is preferably 50° or larger and more preferably 70° or larger. When the angle of contact ($\theta_1$) of the paraffin-based lubricating oil with the side faces of the side rails at 150° C. falls within the above range, the flow of the oil from the side rails toward the spacer expander is more likely to be generated, so that the oil including oil sludge built up between the spacer expander and the side rails can be more smoothly discharged. Preferably, the side rails used have a configuration in which their side faces are coated with an oil repellent coating such as a fluorine-containing coating. No particular limitation is imposed on the composition of the oil repellent coating, so long as $\theta_1$ falls within the above range. Specific examples of the fluorine-containing coating include: a coating described in Japanese Patent Application Laid-Open No. 2010-18779 and obtained from a composition prepared by polymerizing four types of monomers ((a), (b), (c), and (d)) shown in TABLE 1; a coating described in WO2011/071117A1 and obtained from a composition prepared by polymerizing three types of monomers ((a), (b), and (d)) shown in TABLE 1; and a polytetrafluoroethylene (PTFE)-dispersed resin-based coating obtained by dispersing PTFE powder in a resin.

In the PTFE-dispersed resin-based coating, a fluorocarbon resin such as modified polytetrafluoroethylene or ethylene tetrafluoroethylene (ETFE) may be used instead of PTFE. Examples of the resin in which PTFE is dispersed include polyester, liquid crystal polyester (LCP), polyethylene, polypropylene (PP), epoxy resin, phenolic resin, polybenzimidazole (PBI), polyvinylidene fluoride (PVDF), polyamide (PA), polyimide(PI), polyamide-imide (PAI), hybrid resins of silica with polyamide-imide or polyimide, polyethylene terephthalate (PET), polybutylene terephthalate (PBT), polytrimethylene terephthalate (PTT), polyethylene naphthalate (PEN), syndiotactic polystyrene resin, polyoxymethylene (POM), polycarbonate (PC), polyphenylene ether (PPE), polyetherimide (PEI), polysulfone (PSU), polyether sulfone, polyketone (PK), polyether ketone (PEK), polyether ketone ketone (PEKK), polyarylate (PAR), polyether nitrile (PEN), and polyether ether ketone (PEEK). These resins may be copolymers or modified products, and a mixture of two or more types may be used. Of these, PI- and PAI-based resins are preferred from the viewpoint of heat resistance and handleability.

When a PTFE-dispersed resin-based coating is used, the average particle diameter of the PTFE powder is preferably 0.2 μm to 5.0 μm.

The thickness of the fluorine-containing coating is preferably 0.05 μm to 3.0 μm, more preferably 0.1 μm to 3.0 μm, and still more preferably 0.3 μm to 2.0 μm. By setting the thickness of the fluorine-containing coating to 0.1 μm or larger, the effect of preventing adhesion and deposition of oil sludge can be obtained for a longer time. Even when the thickness of the fluorine-containing coating is set to be larger than 3.0 μm, the effect of preventing adhesion and deposition of oil sludge can be obtained, but the large thickness may result in problems such as an increase in combined tension of the oil ring and an increase in material cost.

TABLE 1

| Compound (Monomer) | Abbreviation | Structural Formula |
|---|---|---|
| (a) | SiMA | $CH_2=C(CH_3)-COO-(CH_2)_3-Si(OCH_3)_3$ |
| (b) | PolySiMA | $CH_2=C(CH_3)-COO-(CH_2)_3-(Si(CH_3)_2O)n-R$ (Number Average Molecular Weight: 10,000) |
| (c) | StMA | $CH_2=C(CH_3)-COO-C_{18}H_{37}$ |
| (d) | C6FMA | $CH_2=C(CH_3)-COO-(CH_2)_2-C_6F_{13}$ |

The oil sludge is more likely to be deposited in the spaces 15 formed between the surfaces of the side rails 11 that face the spacer expander 12 and the base dents 14 disposed between the tabs 13 and the protruding portions 16 of the spacer expander 12. Therefore, when an oil repellent coating such as a fluorine-containing coating is formed on each of the surfaces of the side rails 11 that face the spacer expander 12, a high effect of preventing adhesion and deposition of oil sludge can be obtained. Of course, the entire surfaces of the side rails 11 may be coated with the oil repellent coating.

No particular limitation is imposed on the material of the side rails 11, and any known material may be used. For example, a material obtained by subjecting a base material formed of spring steel or a base material formed of martensitic stainless steel to nitriding treatment is used. In the present invention, when the side rails are coated with, for example, an oil repellent coating, it is sufficient that the side faces facing the spacer expander 12 be coated. The outer peripheral faces may be coated with a wear resistant coating such as a hard chromium plating or a CrN coating formed by ion plating.

2) Spacer Expander

The angle of contact ($\theta_2$) of the paraffin-based lubricating oil with the surface of the spacer expander at 150° C. is lower by at least 30° than the angle of contact ($\theta_1$) of the paraffin-based lubricating oil with the side faces of the side rails that face the spacer expander at 150° C. The convection caused by the difference in oil repellency and the difference in temperature causes the flow of oil from the side rails toward the spacer expander, so that the oil including oil sludge built up between the spacer expander and the side rails can be rapidly discharged. Therefore, adhesion and deposition of oil sludge are effectively suppressed, and the occurrence of sticking of the multi-piece oil ring can be prevented.

More specifically, the angle of contact ($\theta_2$) of the paraffin-based lubricating oil with the surface of the spacer expander at 150° C. is preferably 10 to 50° and more preferably 10 to 30°. When the angle of contact ($\theta_2$) of the paraffin-based lubricating oil with the surface of the spacer expander at 150° C. falls within the above range, the flow of the oil from the side rails toward the spacer expander is more likely to be generated, so that the oil including oil sludge built up between the spacer expander and the side rails can be more smoothly discharged. Preferably, the spacer expander used is configured to be coated with a metal coating etc. No particular limitation is imposed on the composition of the metal coating, so long as $\theta_2$ falls within the above range. Specific examples of the metal material that can form the metal coating include Ni, Cu, and alloys containing Ni or Cu. No particular limitation is imposed on the method of forming the coating, and any of electroplating, electroless plating, CVD (chemical vapor deposition), sputtering, etc. is used.

Preferably, the surface free energy of the surface of the spacer expander of the multi-piece oil ring of the invention at 60° C. is 100 mJ/m$^2$ or lower, and a hydrogen bond component, which is a component of the surface free energy (hereinafter simply referred to as a "hydrogen bond component"), at 60° C. is 4 mJ/m$^2$ or lower. More preferably, the surface free energy is 40 mJ/m$^2$ or lower, and the hydrogen bond component is 1.0 mJ/m$^2$ or lower. The surface free energy and the hydrogen bond component are measured by the following method.

(Method of Measuring Surface Free Energy and Hydrogen Bond Component)

The angles of contact of distilled water, ethylene glycol, and 1-bromonaphthalene on a target specimen are measured using an automatic contact angle meter (Drop Master 500, manufactured by Kyowa Interface Science Co., Ltd.). During the measurement, the measurement specimen is secured to an aluminum-made hot stage equipped with a heater, and the temperature of the specimen surface is measured by a thermocouple and controlled to 60±2° C.

The surface free energy and hydrogen bond component can be determined from the measured angles of contact using surface free energy analysis add-in software (FAMAS) manufactured by Kyowa Interface Science Co., Ltd.

By setting the surface free energy and hydrogen bond component of the metal coating at 60° C. within the above ranges, adhesion of oil sludge is significantly reduced, so that a higher effect of preventing adhesion and deposition of oil sludge can be obtained.

The sliding angle of the paraffin-based lubricating oil on the portion of the spacer expander that is coated with the metal coating at 150° C. is preferably 15° or smaller. By setting the sliding angle of the lubricating oil within the above range, the oil flowing from the side rails can be rapidly discharged from the spacer expander, so that a higher effect of preventing adhesion and deposition of oil sludge is obtained.

The sliding angle of the paraffin-based lubricating oil at 150° C. is measured by the following method.

(Method of Measuring Sliding Angle)

A measurement specimen is secured to an aluminum-made hot stage equipped with a heater, and the temperature of the surface of the measurement specimen is measured by a thermocouple and controlled to 150±2° C. With the measurement specimen held horizontally, 30 μl of a paraffin-based lubricating oil (paraffin-based raw lubricating oil "Super Oil N100," manufactured by Nippon Oil Corporation) is dropped onto the surface of the specimen using a micropipette. Then the measurement specimen is inclined by 1° at a time, and an inclination angle when the trailing side of the oil droplet starts moving is used as the sliding angle. Each time after the specimen is inclined 1°, the specimen is allowed to rest for 1 minute. After it is confirmed that the trailing side of the oil droplet is not moving, the specimen is further inclined. The measurement is performed at 5 points for each measurement specimen, and the average value is used as the sliding angle of the specimen.

The thickness of the metal coating is preferably 0.1 μm to 10 μm. By setting the thickness of the metal coating to be 0.1 μm or larger, the surface free energy and hydrogen bond component are sufficiently reduced, and therefore a higher effect of preventing adhesion and deposition of oil sludge is obtained. When the thickness of the metal coating is larger than 10 the effect of preventing adhesion and deposition of oil sludge is obtained. However, the large thickness may result in problems such as an increase in combined tension of the oil ring, an increase in film formation time, and an increase in material cost. Therefore, in consideration of the above facts, the upper limit is preferably 10 μm. In electroplating, the thickness of the coating can be generally controlled by adjusting plating time and a current value.

The surface roughness Ra of the metal coating in the present invention is preferably 0.005 μm to 0.4 μm and more preferably 0.005 μm to 0.3 μm. By adjusting the surface roughness of the metal coating within the above range, the fluidity of the oil on the surface of the coating is improved, and the function of discharging oil sludge is enhanced. Therefore, a higher effect of preventing adhesion and deposition of oil sludge is obtained. To control the surface roughness Ra of the metal coating within the above range, it is desirable to adjust the surface roughness Ra of the members that form the oil ring to 0.005 μm to 0.4 μm and preferably 0.005 μm to 0.3 μm. The surface roughness Ra of the constituent members can be adjusted by polishing. The spacer expander is generally produced by gear molding. The surface roughness of the spacer expander may also be controlled by adjusting the surface roughness of the gear.

In the present description, the "surface roughness" is represented by center line average roughness Ra and is a value measured by the following method.

Surface roughness meter: SURFCOM 1400D, manufactured by TOKYO SEIMITSU Co., Ltd.
JIS standard: JIS B0601-1982
Cut-off value λc: 0.08 mm
Evaluation length (3λc or longer): 0.25 mm No particular limitation is imposed on the material of the spacer expander 12, and any known material may be used. For example, austenitic stainless steel such as SUS304 is used. Particularly, the use of a material subjected to nitriding treatment is preferred because the tabs can have high wear resistance. However, the spacer expander has a complicated shape. Therefore, when the entire spacer expander is subjected to nitriding treatment, the depth of the nitride layer becomes uneven, and this causes unevenness in tension of the multi-piece oil ring. Therefore, it is preferable to nitride only the tabs by the following method. A flat wire for the spacer expander that is coated with a metal coating such as a Ni plating or a Cu plating over the entire surface in advance is formed into a wavy shape by plastic working, and simultaneously tabs are formed on the inner peripheral portions of the wavy wire by shearing. The surfaces of the tabs newly formed by shearing are not coated with the metal coating. The Ni plating film or Cu plating film functions not only as a coating for preventing adhesion and deposition of oil sludge but also as a coating for preventing nitriding. Therefore, only the tabs not covered with the metal coating are nitrided in the subsequent nitriding treatment, and no nitride layer is formed on the other surfaces coated with the metal coating. Accordingly, unevenness in tension of the multi-piece oil ring caused by unevenness in the thickness of the nitride layer is reduced.

The oil sludge is more likely to be deposited in the spaces 15 formed between the surfaces of the side rails 11 that face the spacer expander 12 and the base dents 14 disposed between the tabs 13 and protruding portions 16 of the spacer expander 12. Therefore, by forming the metal coating on the upper and lower faces of the spacer expander 12, a higher effect of preventing adhesion and deposition of oil sludge is obtained.

In the present description, the multi-piece oil ring including the spacer expander having an axially wavy shape shown in FIG. 1 has been described. However, the invention is applicable to a multi-piece oil ring including a spacer expander having a radially wavy shape.

EXAMPLES

The present invention will next be more specifically described by way of Examples, but the invention is not limited to these Examples.

The side rails and spacer expander of the multi-piece oil ring having the configuration shown in FIG. 1 were coated with respective coatings showing in TABLE 2. The multi-piece oil ring obtained by combining these components was attached to an engine for an internal combustion engine, and the effect of preventing adhesion and deposition of oil sludge was evaluated.

The details will be shown below.

Example 1

(1) Production of Side Rails

A closed container was charged with respective monomers, a polymerization solvent, and a polymerization initiator in a mass ratio shown in TABLE 2, and the reaction was allowed to proceed at 70° C. for 26 hours to thereby obtain a polymerized composition. The polymerization initiator used was an initiator V-601 manufactured by Wako Pure Chemical Industries, Ltd., and the solvent used was metaxylene hexafluoride (m-XHF). The obtained polymerized composition was diluted with m-XHF such that the content of the polymer was 5% by mass to thereby obtain a coating solution. Side rails formed of 17Cr martensitic stainless steel were immersed in the coating solution for 30 seconds. After the side rails were removed from the solution, they were placed in an electric furnace and subjected to heat treatment in air at 120° C. for 1 hour. The angle of contact ($\theta_1$) of the paraffin-based lubricating oil with the side face portions of the obtained side rails at 150° C. that were coated with the fluorine-containing coating was 52°, and the thickness of the fluorine-containing coating was 0.4 μm.

(2) Production of Spacer Expander

The surface of a rolled strip (made of SUS304) for a spacer expander that had an R-shaped edge was polished such that the surface roughness Ra (center line average roughness) of the wire was 0.02 μm±0.01 μm and then degreased in acetone. While wound at a rate of 3 m/min, this rolled strip was subjected to Ni plating treatment using a wire plating apparatus. A nickel sulfamate bath was used as a plating bath. The thickness of the obtained Ni-plating film was about 5 μm. After the plating treatment, the wire was placed in an electric furnace and subjected to heat treatment at 500° C. for 60 minutes.

Then the wire was gear-molded into an axially wavy shape. Then tabs were formed at one end portion of the wire by axial shearing and then molded and cut into a ring shape such that the tabs were on the inner peripheral side to thereby form a spacer expander. The obtained spacer expander was placed in a gas nitriding furnace, and nitriding treatment was performed at 570° C. for 80 minutes under ammonia gas flow.

A nitride layer was formed on the tabs of the spacer expander that were produced by shearing, but no nitride layer was formed on the other surfaces coated with the Ni-plating film. The angle of contact ($\theta_2$) of the paraffin-based lubricating oil with the base dents having the Ni-plating film formed thereon at 150° C. was 18°. The surface free energy at 60° C. was 38 mJ/m$^2$, and the hydrogen bonding strength was 0.4 mJ/m$^2$.

(3) Production of Three-Piece Oil Ring

The produced side rails and spacer expander were combined to produce a three-piece oil ring. The nominal diameter (d1) of the ring was 71 mm, the combined nominal width (h1) was 1.5 mm, the combined thickness (a1) was 1.9 mm, and the tension was 8.1 N.

Example 2

(1) Production of Side Rails

Side rails were produced as in Example 1.

(2) Production of Spacer Expander

The surface of a rolled strip (made of SUS304) for a spacer expander that had an R-shaped edge was polished such that the line surface roughness Ra (center line average roughness) was 0.02 μm±0.01 μm and then degreased in acetone. While wound at a rate of 3 m/min, this rolled strip was subjected to Cu plating treatment using a wire plating apparatus in a plating bath containing 220 g/L of copper sulfate, 60 g/L of sulfuric acid, and 50 mg/L of chlorine ions. The thickness of the obtained Cu plating film was about 5 µm. After the plating treatment, the wire was placed in an electric furnace and subjected to heat treatment at 500° C. for 60 minutes.

Then the wire was gear-molded into an axially wavy shape. Then tabs were formed at one end portion of the wire by axial shearing and then molded and cut into a ring shape such that the tabs were on the inner peripheral side to thereby form a spacer expander. The obtained spacer expander was placed in a gas nitriding furnace, and nitriding treatment was performed at 570° C. for 80 minutes under ammonia gas flow. A nitride layer was formed on the tabs of the spacer expander that were produced by shearing, but no nitride layer was formed on the other surfaces coated with the Cu-plating film. The angle of contact ($\theta_2$) of the paraffin-based lubricating oil with the base dents having the Cu-plating film formed thereon at 150° C. was 14°. The surface free energy at 60° C. was 35 mJ/m$^2$, and the hydrogen bonding strength was 0.1 mJ/m$^2$.

(3) Production of Three-Piece Oil Ring

The produced side rails and spacer expander were combined to produce a three-piece oil ring. The nominal diameter (d1) of the ring was 71 mm, the combined nominal width (h1) was 1.5 mm, and the combined thickness (a1) was 1.9 mm.

Example 3

(1) Production of Side Rails

A closed container was charged with respective monomers, a polymerization solvent, and a polymerization initiator in a mass ratio shown in TABLE 2, and the reaction was allowed to proceed at 70° C. for 26 hours to thereby obtain a polymerized composition. The polymerization initiator used was an initiator V-601 manufactured by Wako Pure Chemical Industries, Ltd., and the solvent used was metaxylene hexafluoride (m-XHF). The obtained polymerized composition was diluted with m-XHF such that the content of the polymer was 5% by mass to thereby obtain a coating solution. Side rails formed of 17Cr martensitic stainless steel were immersed in the coating solution for 30 seconds. After the side rails were removed from the solution, they were placed in an electric furnace and subjected to heat treatment in air at 120° C. for 1 hour. The angle of contact ($\theta_1$) of the paraffin-based lubricating oil with the side face portions of the obtained side rails at 150° C. that were coated with the fluorine-containing coating was 68°, and the thickness of the fluorine-containing coating was 0.4 µm.

(2) Production of Spacer Expander

Side rails were produced as in Example 1.

(3) Production of Three-Piece Oil Ring

The produced side rails and spacer expander were combined to produce a three-piece oil ring. The nominal diameter (d1) of the ring was 71 mm, the combined nominal width (h1) was 1.5 mm, and the combined thickness (a1) was 1.9 mm.

Example 4

(1) Production of Side Rails

A container was charged with polyamide imide resin (HR-13NX, manufactured by TOYOBO Co., Ltd.), PTFE powder (LUBRON, manufactured by DAIKIN INDUSTRIES, Ltd.), and cyclohexanone, and the mixture was stirred sufficiently using a mixer and passed through a triple roll mill with its roll gap set to a minimum to thereby prepare a coating solution. The amount added of the PTFE powder was adjusted so as to be 75% with respect to the total mass of a coating. The obtained coating solution was applied to the upper and lower side faces of side rails formed of 17Cr martensitic stainless steel by spray coating and heated in an electric furnace. The angle of contact ($\theta_1$) of the paraffin-based lubricant with the side face portions of the obtained side rails at 150° C. that were coated with the fluorine-containing coating was 77°, and the thickness of the fluorine-containing coating was 1 µm.

(2) Production of Spacer Expander

Side rails were produced as in Example 1.

(3) Production of Three-Piece Oil Ring

The produced side rails and spacer expander were combined to produce a three-piece oil ring. The nominal diameter (d1) of the ring was 71 mm, the combined nominal width (h1) was 1.5 mm, and the combined thickness (a1) was 1.9 mm.

Example 5

Side rails and a spacer expander produced as in Example 1 except that the spacer expander was not coated with a metal coating were combined to produce a three-piece oil ring. The values of d1, h1, and a1 were the same as those in Example 1. The paraffin-based lubricating oil was dropped onto the surface of the spacer expander adjusted to 150° C. However, the solution was spread over the substrate, and no droplet was formed, so that a correct angle of contact ($\theta_2$) could not be measured ($\theta_2 \leq 10°$).

The same side rails and spacer expanders as those in the Examples were subjected to surface treatment shown in TABLE 2 and used to produce multi-piece oil rings of Comparative Examples. Each of the obtained multi-piece oil rings was attached to an engine for an internal combustion engine, and the effect of preventing adhesion and deposition of oil sludge was evaluated as in the Examples.

The details of the Comparative Examples are shown below.

Comparative Example 1

Side rails and a spacer expander produced as in Example 1 except that the side rails were not coated with the fluorine-containing coating and no Ni plating film was formed on the spacer expander were combined to produce a three-piece oil ring. The values of d1, h1, and a1 were the same as those in Example 1. The paraffin-based lubricating oil was dropped onto the surface of the side rails adjusted to 150° C. However, the solution was spread over the substrate, and no droplet was formed, so that a correct angle of contact ($\theta_1$) could not be measured ($\theta_1 \leq 10°$). The same phenomenon occurred on the spacer expander, so that a correct angle of contact ($\theta_2$) could not be measured ($\theta_2 \leq 10°$).

Comparative Example 2

Side rails and a spacer expander produced as in Example 1 except that the side rails were not coated with the fluorine-containing coating were combined to produce a three-piece oil ring. The values of d1, h1, and a1 were the same as those in Example 1.

Comparative Example 3

A wire for side rails formed of 17Cr martensitic stainless steel was subjected to Ni plating treatment using a wire plating apparatus while wound at a rate of 3 m/min. The plating bath used was a nickel sulfamate bath. The angle of contact ($\theta_1$) of the paraffin-based lubricating oil with the side face portions of the obtained side rails at 150° C. that were coated with the Ni plating film was 18°. These side rails and a Ni-plated spacer expander produced as in Example 1 were combined to produce a three-piece oil ring. The values of d1, h1, and a1 were the same as those in Example 1.

Comparative Example 4

Side rails and a spacer expander produced as in Example 1 except that the spacer expander was coated with the same coating as the fluorine-containing coating covering the side rails in Example 1 were combined to produce a three-piece oil ring. The values of d1, h1, and a1 were the same as those in Example 1. The angle of contact ($\theta_2$) of the paraffin-based lubricant with the base dents of the obtained spacer expander at 150° C. that were coated with the fluorine-containing coating was 52°.

Comparative Example 5

Side rails coated with a Ni plating film by the same method as in Comparative Example 3 and a spacer expander coated with a fluorine-containing coating by the same method as in Comparative Example 4 were combined to produce a three-piece oil ring. The values of d1, h1, and a1 were the same as those in Example 1.

Comparative Example 6

Isopropyl alcohol was added to perfluoroalkoxy silane (SRS-500, manufactured by SEIMI CHEMICAL Co., Ltd.) to adjust the viscosity thereof, whereby a coating solution was prepared. Side rails formed of 17Cr martensitic stainless steel were immersed in the coating solution for 30 seconds, removed from the solution, placed in an electric furnace, and subjected to heat treatment in air at 120° C. for 1 hour. The angle of contact ($\theta_1$) of the paraffin-based lubricating oil with the side face portions of the obtained side rails at 150° C. that were coated with the fluorine-containing coating was 46°, and the thickness of the fluorine-containing coating was 0.3 µm.

These side rails and a Ni-plated spacer expander produced as in Example 1 were combined to produce a three-piece oil ring. The values of d1, h1, and a1 were the same as those in Example 1.

(Engine Test)

The three-piece oil rings in Examples 1 to 5 and Comparative Examples 1 to 6 were attached to 1-L three cylinder engines. An engine test in which patterned operation was repeated was performed on these engines. After 200 hours and 300 hours, the amount of adhering oil sludge was measured according to the following evaluation method. The engine test was repeated a total of three times under the same operating conditions. At each repetition, each oil ring was attached to a different cylinder. Top rings and second rings having the following specifications were used.

(A) Top Rings

Material: SWOSC-V, the outer peripheral face was ion-plated with chromium nitride Dimensions: d1=71 mm, h1=1.0 mm, a1=2.3 mm (B) Second Rings Material: SWOSC-V, the entire surface was treated with zinc phosphate Dimensions: d1=71 mm, h1=1.0 mm, a1=2.3 mm The mass of each oil ring immediately after the operation was measured, and the difference from the mass of the oil ring measured before attachment was computed. The average value for the three repetitions of the engine test was used as the amount of adhering oil sludge. The results are shown in TABLE 2. The amount of adhering oil sludge is represented as a relative value when the amount of adhering oil sludge in Comparative Example 1 in which no coatings are formed on the side rails and the spacer expander is set to 100.

In Comparative Example 1, no coatings were formed on the side rails and the spacer expander. However, in Comparative Example 2, only the spacer expander was coated with the Ni plating film, and the amount of adhering oil sludge after 200 hours was reduced by about 30% as compared to that in Comparative Example 1. Therefore, it was found that the Ni plating film provides the effect of preventing adhesion and deposition of oil sludge. In Comparative Example 3 in which the side rails were also coated with the Ni plating film, the amount of adhering oil sludge after 200 hours was further reduced, and the effect obtained by coating the side rails and the spacer expander with the Ni plating film was found.

Also in Comparative Example 4 in which the side rails and the spacer expander were coated with the fluorine-containing polymer coating, the amount of adhering oil sludge after 200 hours was reduced, and the effect obtained by coating the side rails and the spacer expander with the fluorine-containing coating was found.

In Comparative Example 5 in which the side rails were coated with the Ni plating film and the spacer expander was coated with the fluorine-containing polymer coating, the amount of adhering oil sludge after 200 hours was reduced by about 40% as compared to that in Comparative Example 1. Therefore, it was found that the combination of the Ni plating film and the fluorine-containing coating further improves the effect of preventing adhesion and deposition of oil sludge. In Example 1 of the invention in which the side rails were coated with the fluorine-containing polymer coating and the spacer expander was coated with the Ni plating film, the amount of adhering oil sludge after 200 hours was further reduced by about 20% as compared to that in Comparative Example 5, and therefore the effects of the present invention were found.

In Comparative Example 6 in which the side rails were coated with a fluorine-based coating solution including perfluoroalkoxy silane and the spacer expander was coated with the Ni plating film, the amount of adhering oil sludge after 200 hours was smaller than those in other Comparative Examples but was larger by about 15% than that in Example 1. This may be because of the following reason. In Example 1, $\theta_1-\theta_2$ was 34°. However, in Comparative Example 6, $\theta_1-\theta_2$ was low, i.e., 28°. Therefore, the generated flow of oil from the side rails toward the spacer expander was insufficient.

In Example 2 in which the spacer expander was coated with the Cu plating film, in Example 3 in which the side rails were coated with a coating formed of a polymer prepared without using a monomer having an oleophilic group and therefore having improved oil repellency, and in Example 4 in which the side rails were coated with a PTFE-dispersed PAI resin coating, the value of $\theta_1-\theta_2$ was found to be still higher than that in Example 1, and the amount of adhering oil sludge was also found to be lower. Also from the above findings, the flow of oil from the side rails toward the spacer expander due to the difference between $\theta_1$ and $\theta_2$ is considered effective to discharge oil sludge.

When the operating time was extended to 300 hours, sticking occurred in all the Comparative Examples. However, in Examples 1 to 4, the amount of adhering oil sludge was increased only slightly, and it was found that a high effect of preventing adhesion and deposition of oil sludge was maintained. This may be because of the following reasons. In Examples 1 to 4, the fluorine-containing coating was maintained for a long time because of a combination of (1) the flow of oil from the side rails toward the spacer expander that was generated because the surfaces of the side rails were coated with the fluorine-containing coating having high oil repellency and the surface of the spacer expander was coated with the metal coating having low oil repellency and (2) a high effect of dissipating heat from the multi-piece oil ring to the oil that was obtained because the spacer expander having a large surface area was coated with the metal coating having high heat dissipation properties. Therefore, a high oil sludge discharging effect was maintained.

In Example 5 in which the side rails were coated with the fluorine-containing polymer coating and the spacer expander was not coated with a coating, the amount of adhering oil sludge after 200 hours was reduced by about 30% as compared to that in Comparative Example 1 but was larger than those in Comparative Examples 2 to 6. However, no sticking occurred even after 300 hours at which sticking was found to occur in the other Comparative Examples, and the amount of adhering oil sludge was increased only slightly. This may be because of the following reason. In the initial state, no significant effect of preventing adhesion of oil sludge was obtained because the spacer expander was not coated with a coating. However, since the difference in oil repellency ($\theta_1 - \theta_2$) between the spacer expander and the side rails was large, i.e., 42° or larger, the flow of oil from the side rails toward the spacer expander was effectively generated, so that the effect of preventing adhesion of oil sludge was maintained for a long time.

TABLE 2

|  |  | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Side Rails | SiMA | 5 | 5 | 5 | — | 5 | — | — | — | 5 | — | — |
|  | PolySiMA | 20 | 20 | 20 | — | 20 | — | — | — | 20 | — | — |
|  | StMA | 5 | 5 | 5 | — | 5 | — | — | — | 5 | — | — |
|  | C6FMA | 75 | 75 | 75 | — | 75 | — | — | — | 75 | — | — |
|  | V-601 | 1 | 1 | 1 | — | 1 | — | — | — | 1 | — | — |
|  | m-XHF | 400 | 400 | 400 | — | 400 | — | — | — | 400 | — | — |
|  | PTFE | — | — | — | 75 | — | — | — | — | — | — | — |
|  | PAI | — | — | — | 25 | — | — | — | — | — | — | — |
|  | SRS-500 | — | — | — | — | — | — | — | — | — | — | Present |
|  | Ni Plating | — | — | — | — | — | — | — | Present | — | Present | — |
|  | No Coating | — | — | — | — | — | No coating | No coating | — | — | — | — |
|  | $\theta_1$ | 52 | 52 | 68 | 77 | 52 | Not Measurable | Not Measurable | 18 | 52 | 18 | 46 |
| Spacer Expander | SiMA | — | — | — | — | — | — | — | — | 5 | 5 | — |
|  | PolySiMA | — | — | — | — | — | — | — | — | 20 | 20 | — |
|  | StMA | — | — | — | — | — | — | — | — | 5 | 5 | — |
|  | C6FMA | — | — | — | — | — | — | — | — | 75 | 75 | — |
|  | V-601 | — | — | — | — | — | — | — | — | 1 | 1 | — |
|  | m-XHF | — | — | — | — | — | — | — | — | 400 | 400 | — |
|  | Ni Plating | Present | — | Present | Present | — | — | Present | Present | — | — | Present |
|  | Cu Plating | — | Present | — | — | — | — | — | — | — | — | — |
|  | No Coating | — | — | — | — | No coating | No coating | — | — | — | — | — |
|  | $\theta_2$ | 18 | 14 | 18 | 18 | Not Measurable | Not Measurable | 18 | 18 | 52 | 52 | 18 |
| $\theta_1 - \theta_2$ |  | 34 | 38 | 50 | 59 | ≥42 | — | — | 0 | 0 | -34 | 28 |
| Amount of Adhering Oil Sludge | After 200 Hours | 42 | 35 | 31 | 29 | 71 | 100 | 68 | 62 | 64 | 59 | 55 |
|  | After 300 Hours | 45 | 38 | 35 | 32 | 78 | — | — | — | — | — | — |

Examples 6 to 8 and Comparative Example 7

Side rails were produced as in Example 1 except that the respective monomers were used in a mass ratio described in TABLE 3. The angle of contact ($\theta_1$) of the paraffin-based lubricating oil with the side face portions of the obtained side rails at 150° C. that were coated with the fluorine-containing coating and $\theta_1 - \theta_2$ are shown in TABLE 3. The thickness of the fluorine-containing coating was 0.4 μm.

The obtained side rails were combined with the same spacer expander as in Example 1 to produce a three-piece oil ring, and an engine test was performed as in Example 1. A three-piece oil ring was produced as in Example 1 except that the respective monomers were used in a mass ratio for Comparative Example 7 shown in TABLE 3, and an engine test was performed as in Example 1.

Figure 2:
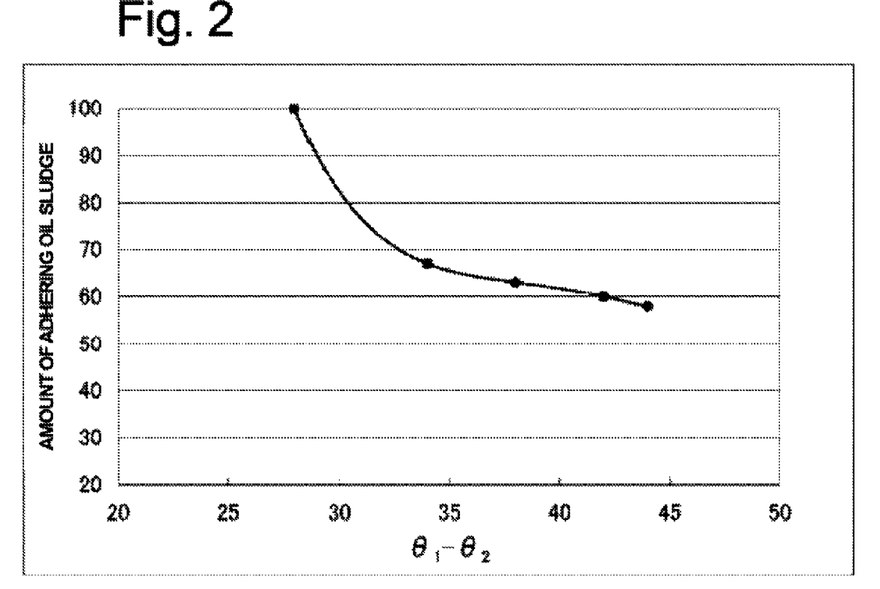
FIG. 2 is a graph showing the relation between $\theta_1 - \theta_2$ and the amount of adhering oil sludge.

FIG. 2 shows the relation between $\theta_1 - \theta_2$ and the amount of adhering oil sludge based on the results in Examples 1 and 6 to 8 and Comparative Example 7. The amount of adhering oil sludge is represented as a relative value when the value in Comparative Example 7 is set to 100. As can be seen from the results in FIG. 2, the amount of adhering oil sludge is significantly reduced when $\theta_1 - \theta_2$ is 30° or larger and is further reduced when $\theta_1 - \theta_2$ is 35° or larger.

TABLE 3

| NO. | Mass Ratio of Respective Components in Polymer | | | | Angle of Contact | |
|---|---|---|---|---|---|---|
| | SiMA | PolySiMA | StMA | C6FMA | ($\theta_1$) | $\theta_1 - \theta_2$ |
| Example 1 | 5 | 20 | 5 | 75 | 52 | 34 |
| Example 6 | 5 | 20 | 1 | 75 | 56 | 38 |
| Example 7 | 5 | 20 | 2 | 75 | 60 | 42 |
| Example 8 | 5 | 20 | 0.5 | 75 | 62 | 44 |
| Comparative Example 7 | 5 | 20 | 20 | 75 | 46 | 28 |

REFERENCE SIGNS LIST

10 Expander/segment oil control ring (three-piece oil ring)
11 Side rail
12 Spacer expander
13 Tab
14 Base dent
15 Space
16 Protruding portion
h1 Axial width

The invention claimed is:

1. A multi-piece oil ring comprising a spacer expander and a pair of upper and lower side rails supported by the spacer expander,
wherein the spacer expander is coated with one of nickel, copper, and alloys of nickel or copper;
wherein the side rails are coated with a hydrophobic fluorine-containing coating that includes at least three of $$CH_2=C(CH_3)-COO-(CH_2)_3-Si(OCH_3)_3 \text{ (SiMA)}, \quad (a)$$

$$CH_2=C(CH_3)-COO-(CH_2)_3-(Si(CH_3)_2O)n\text{-}R \text{ (Poly-SiMA)}, \quad (b)$$

$$CH_2=C(CH_3)-COO-C_{18}H_{37} \text{ (StMA), and} \quad (c)$$

$$CH_2=C(CH_3)-COO-(CH_2)_2-C_6F_{13} \text{ (C6FMA);} \quad (d)$$
and
wherein each of the side rails has a side face that faces the spacer expander, each of the side rails configured such that an angle of contact ($\theta_1$) of a paraffin-based lubricating oil with side faces of the side rails that face the spacer expander at 150° C. is larger than an angle of contact ($\theta_2$) of the paraffin-based lubricating oil with a surface of the spacer expander at 150° C., and a difference between $\theta_1$ and $\theta_2$ ($\theta_1-\theta_2$) is 30° or larger.

2. The multi-piece oil ring according to claim 1, wherein the angle of contact ($\theta_1$) of the paraffin-based lubricating oil with the side faces of the side rails that face the spacer expander at 150° C. is 50° or larger.

3. The multi-piece oil ring according to claim 1, wherein the angle of contact ($\theta_2$) of the paraffin-based lubricating oil with the surface of the spacer expander at 150° C. is 10 to 50°.

4. The multi-piece oil ring according to claim 1, wherein the side faces of the side rails that face the spacer expander are coated with a fluorine-containing coating.

5. The multi-piece oil ring according to claim 4, wherein a thickness of the fluorine-containing coating is 0.05 μm to 3.0 μm.

6. The multi-piece oil ring according to claim 1, wherein the spacer expander is coated with a Copper or Copper alloy coating.

7. The multi-piece oil ring according to claim 1, wherein the spacer expander is coated with a Nickel or Nickel alloy coating.

8. The multi-piece oil ring according to claim 6, wherein a thickness of the Copper or Copper alloy coating is 0.1 μm to 10 μm.

9. The multi-piece oil ring according to claim 6, wherein the Copper or Copper alloy coating has a surface free energy of 100 mJ/m² or lower at 60° C. and a hydrogen bond component of 4 mJ/m² or lower at 60° C.

10. The multi-piece oil ring according to claim 2, wherein the angle of contact ($\theta_2$) of the paraffin-based lubricating oil with the surface of the spacer expander at 150° C. is 10 to 50°.

11. The multi-piece oil ring according to claim 2, wherein the side faces of the side rails that face the spacer expander are coated with a fluorine-containing coating.

12. The multi-piece oil ring according to claim 3, wherein the side faces of the side rails that face the spacer expander are coated with a fluorine-containing coating.

13. The multi-piece oil ring according to claim 2, wherein the spacer expander is coated with a Copper or Copper alloy.

14. The multi-piece oil ring according to claim 3, wherein the spacer expander is coated with a Copper or Copper alloy.

15. The multi-piece oil ring according to claim 4, wherein the spacer expander is coated with a Copper or Copper alloy.

16. The multi-piece oil ring according to claim 5, wherein the spacer expander is coated with a Copper or Copper alloy.

17. The multi-piece oil ring according to claim 7, wherein a thickness of the Nickel or Nickel alloy coating is 0.1 μm to 10 μm.

18. The multi-piece oil ring according to claim 7, wherein the Nickel or Nickel alloy coating has a surface free energy of 100 mJ/m² or lower at 60° C. and a hydrogen bond component of 4 mJ/m² or lower at 60° C.

19. The multi-piece oil ring according to claim 8, wherein the Copper or Copper alloy coating has a surface free energy of 100 mJ/m² or lower at 60° C. and a hydrogen bond component of 4 mJ/m² or lower at 60° C.

20. The multi-piece oil ring according to claim 1, wherein the Poly-SiMA has a number average molecular weight of 10,000.

* * * * *